United States Patent
Li et al.

(10) Patent No.: US 12,330,185 B2
(45) Date of Patent: Jun. 17, 2025

(54) COATING APPARATUS AND COATING METHOD

(71) Applicant: SHENZHEN MANST TECHNOLOGY CO., LTD., Guangdong (CN)

(72) Inventors: Ning Li, Shenzhen (CN); Guishan Chen, Shenzhen (CN); Jin Chai, Shenzhen (CN); Zheng Liu, Shenzhen (CN)

(73) Assignee: SHENZHEN MANST TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/840,798

(22) PCT Filed: Feb. 24, 2022

(86) PCT No.: PCT/CN2022/077755
§ 371 (c)(1),
(2) Date: Aug. 22, 2024

(87) PCT Pub. No.: WO2023/159438
PCT Pub. Date: Aug. 31, 2023

(65) Prior Publication Data
US 2025/0108402 A1    Apr. 3, 2025

(51) Int. Cl.
*B05C 5/02*    (2006.01)
*B05C 11/10*   (2006.01)
*H01M 4/04*    (2006.01)

(52) U.S. Cl.
CPC ........ *B05C 5/0262* (2013.01); *B05C 11/1005* (2013.01); *H01M 4/0404* (2013.01)

(58) Field of Classification Search
CPC . B05C 5/0262; B05C 11/1005; H01M 4/0404
See application file for complete search history.

(56) References Cited

U.S. PATENT DOCUMENTS

2023/0080280 A1    3/2023    Lee et al.

FOREIGN PATENT DOCUMENTS

| CN | 109225763 A | 1/2019 |
|---|---|---|
| CN | 109513570 A | 3/2019 |

(Continued)

OTHER PUBLICATIONS

Wu, X., "Simulation of initial flow field in slits coating of lithium ion battery slurry," Power Supply Technology, Issue 4, pp. 33-36 (Apr. 20, 2018).

(Continued)

*Primary Examiner* — Alexander M Weddle
(74) *Attorney, Agent, or Firm* — Maschoff Brennan

(57) ABSTRACT

Disclosed are coating equipment and a coating method. The coating equipment comprises a coating die and a slurry parameter detector. The coating die comprises a first slot, a second slot, a first adjusting mechanism and a second adjusting mechanism. Through the arrangement of the first adjusting mechanism and the second adjusting mechanism, adjustment of the flow rate of slurry circulating in the first slot and the second slot can be realized, and parameters of coated slurry are detected by a slurry parameter detector, and are then compared with preset values, and comparison results are fed back to the first adjusting mechanism and the second adjusting mechanism for adjustment of the first adjusting piece and the second adjusting piece, so that automatic adjustment of double-layer die coating is realized, the debugging effectiveness is greatly improved, and the coating efficiency is further improved.

9 Claims, 6 Drawing Sheets

(56) References Cited

FOREIGN PATENT DOCUMENTS

| | | | | |
|---|---|---|---|---|
| CN | 109550642 A | * | 4/2019 | ............. B05C 11/02 |
| CN | 208810447 U | | 5/2019 | |
| CN | 110252593 A | | 9/2019 | |
| CN | 209772575 U | | 12/2019 | |
| CN | 112007824 A | * | 12/2020 | ........... B05C 5/0258 |
| CN | 112871579 A | * | 6/2021 | ............... B05C 1/02 |
| CN | 214320738 U | | 10/2021 | |
| CN | 214390896 U | * | 10/2021 | ........... B05C 11/025 |
| JP | H07-204561 A | | 8/1995 | |
| JP | 2000-334359 A | | 12/2000 | |
| JP | 2002-282759 A | | 10/2002 | |
| JP | 2012138302 A | | 7/2012 | |
| KR | 10-2020-0114417 A | | 10/2020 | |
| KR | 10-2239354 B1 | | 4/2021 | |
| WO | 2022/030902 A1 | | 2/2022 | |

OTHER PUBLICATIONS

International Search Report dated Nov. 8, 2022 as received in Application No. PCT/CN2022/077755.
CN First Office Action dated Feb. 20, 2023 as received in Application No. 202280000441.4.
Extended European Search Report dated Aug. 9, 2023 as received in Application No. 22712488.0.
CN Second Office Action dated Aug. 24, 2023 as received in Application No. 202280000441.4.
CN Decision to Grant Dated Feb. 7, 2024 as received in Application No. 202280000441.4.

* cited by examiner

COATING APPARATUS AND COATING METHOD

TECHNICAL FIELD

The present application relates to the technical field of battery electrode piece coating, in particular to coating equipment and a coating method.

BACKGROUND

Due to the advantages of high specific capacity, high working voltage, no environmental pollution, long cycle life, wide working temperature range and the like, lithium ion batteries are widely applied to electronic products such as mobile phones, notebook computers and digital cameras, and automobiles. With the rapid development of science and economy, the requirements on the performance of the lithium ion batteries are getting higher and higher.

At present, a double-layer coating die in the lithium battery industry is mainly adjusted manually, and the adjustment method has higher requirements on skills of debugging personnel, resulting in poor debugging effectiveness and low efficiency.

SUMMARY

Therefore, the technical problems to be solved by the present application lie in the defects of poor debugging effectiveness and low efficiency caused by the manual adjustment of the existing double-layer coating die in the prior art.

Therefore, the present application provides coating equipment, comprising:
a coating die, wherein the coating die comprises:
a first slot configured for circulation of first slurry and a second slot configured for circulation of second slurry, wherein an intersection angle is formed between the first slot and the second slot;
a first adjusting mechanism, wherein the first adjusting mechanism comprises a first driving piece and a first adjusting piece, and a driving end of the first driving piece is connected with the first adjusting piece; and
a second adjusting mechanism, wherein the second adjusting mechanism comprises a second driving piece and a second adjusting piece, and a driving end of the second driving piece is connected with the second adjusting piece; and
a slurry parameter detector, wherein the slurry parameter detector is in communication connection with the first adjusting mechanism and the second adjusting mechanism and is configured to detect information of slurry on an electrode piece;
wherein,
the slurry parameter detector is configured to detect slurry information of the first slurry coated on the electrode piece via the first slot and form a first slurry parameter, and the first adjusting mechanism is configured to adjust the position of the first adjusting piece according to the first slurry parameter so as to adjust the flow rate of the first slurry circulating in the first slot; and/or
the slurry parameter detector is configured to detect slurry information of the second slurry coated on the electrode piece via the second slot and form a second slurry parameter, and the second adjusting mechanism is configured to adjust the position of the second adjusting piece according to the second slurry parameter so as to adjust the flow rate of the second slurry circulating in the second slot.

Optionally, the coating equipment further comprises an upper die, a middle die and a lower die, wherein the upper die and the middle die define the first slot, and the lower die and the middle die define the second slot;
the first adjusting mechanism is arranged on the upper die and/or the middle die, and the second adjusting mechanism is arranged on the lower die and/or the middle die.

Optionally, the coating equipment further comprises:
a first gasket, wherein the first gasket is arranged between the upper die and the middle die, so that the first gasket, the upper die and the middle die jointly define the first slot; and
a second gasket, wherein the second gasket is arranged between the middle die and the lower die, so that the second gasket, the middle die and the lower die jointly define the second slot.

Optionally, in the coating equipment, at the intersection of the first slot and the second slot, the upper die and the lower die jointly define a die lip for slurry to flow out;
the lower die comprises a deformation part and a base part, the deformation part is arranged on a side close to the die lip, and the base part is arranged on a side away from the die lip;
the second driving piece is mounted on the base part, and the second adjusting piece is connected with the deformation part; the second adjusting piece has a die lip adjusting state of driving the deformation part to move towards or away from the base part under the action of the second driving piece, and in the die lip adjusting state, a lower lip of the lower die is warped relative to an upper lip of the upper die.

Optionally, in the coating equipment, the middle die comprises a first slurry-feeding port, one end of the first slurry-feeding port is configured to be connected with a first slurry-supply system, and the other end of the first slurry-feeding port communicates with the first slot;
the lower die comprises a second slurry-feeding port, one end of the second slurry-feeding port is configured to be connected with a second slurry-supply system, and the other end of the second slurry-feeding port communicates with the second slot.

Optionally, in the coating equipment, the slurry parameter detector is a thickness detector, and the thickness detector is configured to detect the thickness of slurry on the electrode piece;
and/or
the slurry parameter detector is a surface density detector, and the surface density detector is configured to detect the surface density of slurry on the electrode piece.

Optionally, in the coating equipment, any one of the adjusting mechanisms further comprises a driving board, wherein the driving board is in communication connection with the corresponding driving piece, and the driving board is in communication connection with the slurry parameter detector;
the driving piece is configured to drive the corresponding adjusting piece to move under the driving of the driving board so as to adjust the flow rate of slurry in the corresponding slot.

Optionally, the coating equipment further comprises a bus socket that is arranged on at least one side of the adjusting mechanism, and the bus socket is in communication connection with the driving board.

Optionally, the coating equipment further comprises a glue dispensing mechanism which comprises a glue dispensing valve and a first glue dispensing channel, wherein the glue dispensing valve is mounted on the upper die, the first glue dispensing channel is arranged in the upper die, and the first glue dispensing channel communicates with the first slot and the glue dispensing valve;

the glue dispensing mechanism further comprises a second glue dispensing channel, wherein the second glue dispensing channel is arranged in the middle die, and the first slot communicates with the second slot through the second glue dispensing channel.

The present application discloses a coating method, comprising:

coating an electrode piece with second slurry;

detecting, by a slurry parameter detector, a parameter of the second slurry on the electrode piece and forming a first detection result;

controlling the position of a second adjusting piece according to the first detection result so as to adjust the parameter of the second slurry on the electrode piece;

stopping coating the electrode piece with the second slurry, and coating the electrode piece with first slurry;

detecting, by the slurry parameter detector, a parameter of the first slurry on the electrode piece and forming a second detection result; and controlling the position of a first adjusting piece according to the second detection result so as to adjust the parameter of the first slurry on the electrode piece.

Optionally, the coating method further comprises:

intermittently stopping coating the electrode piece with the first slurry; and detecting the parameter of the second slurry on the electrode piece and forming a third detection result.

Optionally, the coating method adopts the coating equipment.

The technical solution provided by the present application has the following advantages:

in the coating equipment provided by the present application, by arranging the first adjusting mechanism and the second adjusting mechanism, adjustment of the flow rate of the slurry circulating in the first slot and the second slot can be realized, and moreover, the parameters of the coated slurry are detected by the slurry parameter detector, and are then compared with preset values, and comparison results are fed back to the first adjusting mechanism and the second adjusting mechanism for adjustment of the first adjusting piece and the second adjusting piece, so that automatic adjustment of double-layer die coating is realized, the debugging effectiveness is greatly improved, and the coating efficiency is further improved.

BRIEF DESCRIPTION OF THE DRAWINGS

In order to more clearly illustrate the specific implementations of the present application or the technical solutions in the prior art, the accompanying drawings required in the description of the specific implementations or the prior art will be briefly introduced below. Obviously, the drawings that will be described below are some implementations of the present application. For those of ordinary skill in the art, other drawings can also be obtained from these drawings without creative work.

DESCRIPTION OF REFERENCE SIGNS

Figure 1:
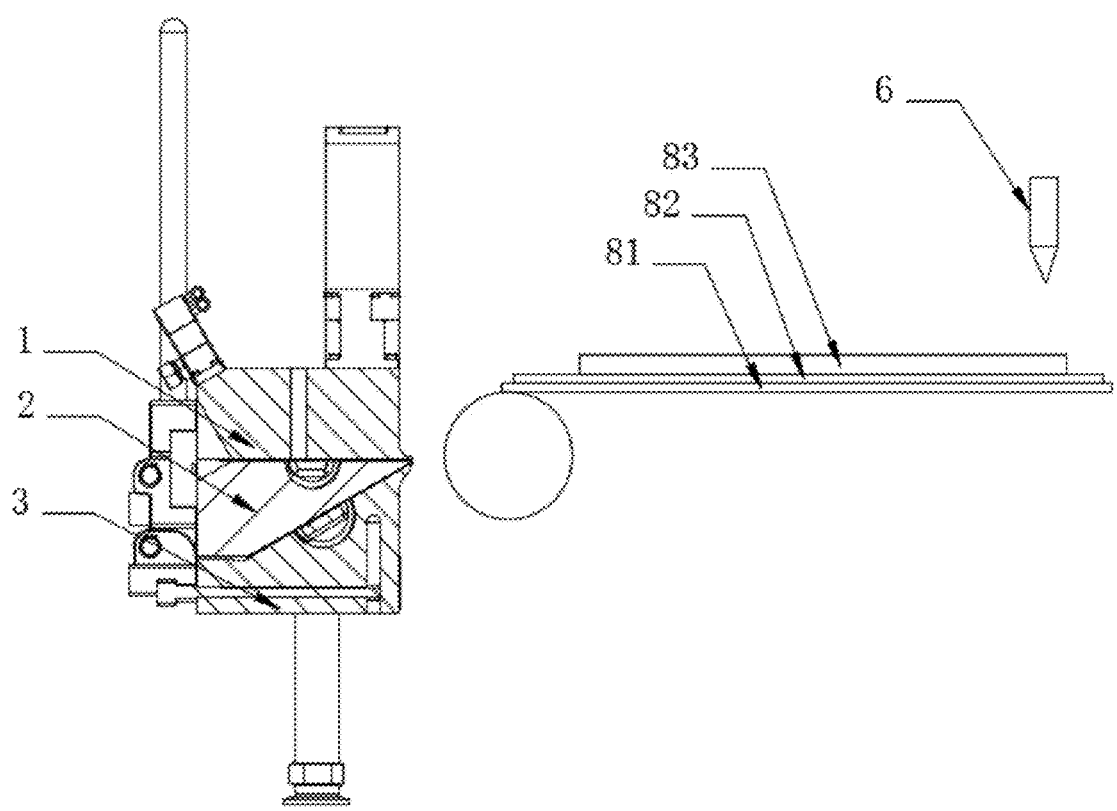
FIG. 1 is a structural schematic diagram of coating equipment provided by embodiments of the present application.
Figure 2:
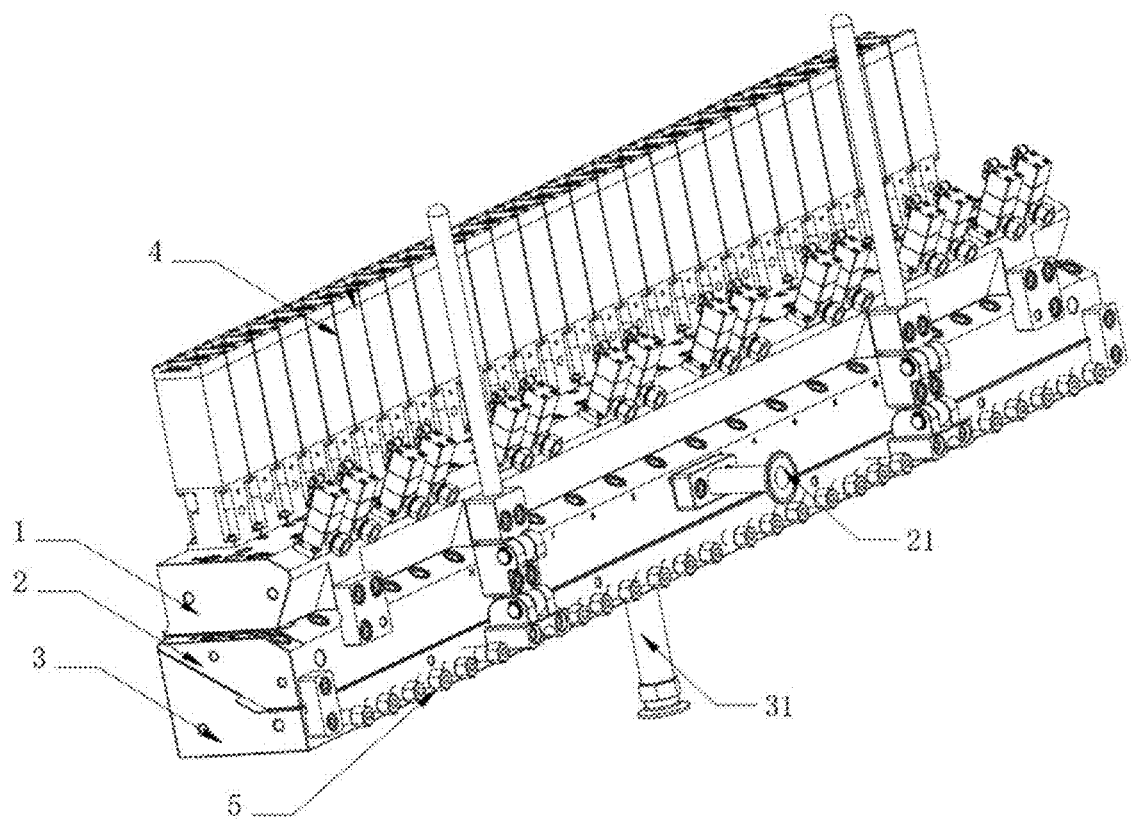
FIG. 2 is a structural schematic diagram of a coating die in coating equipment provided by embodiments of the present application.
Figure 3:
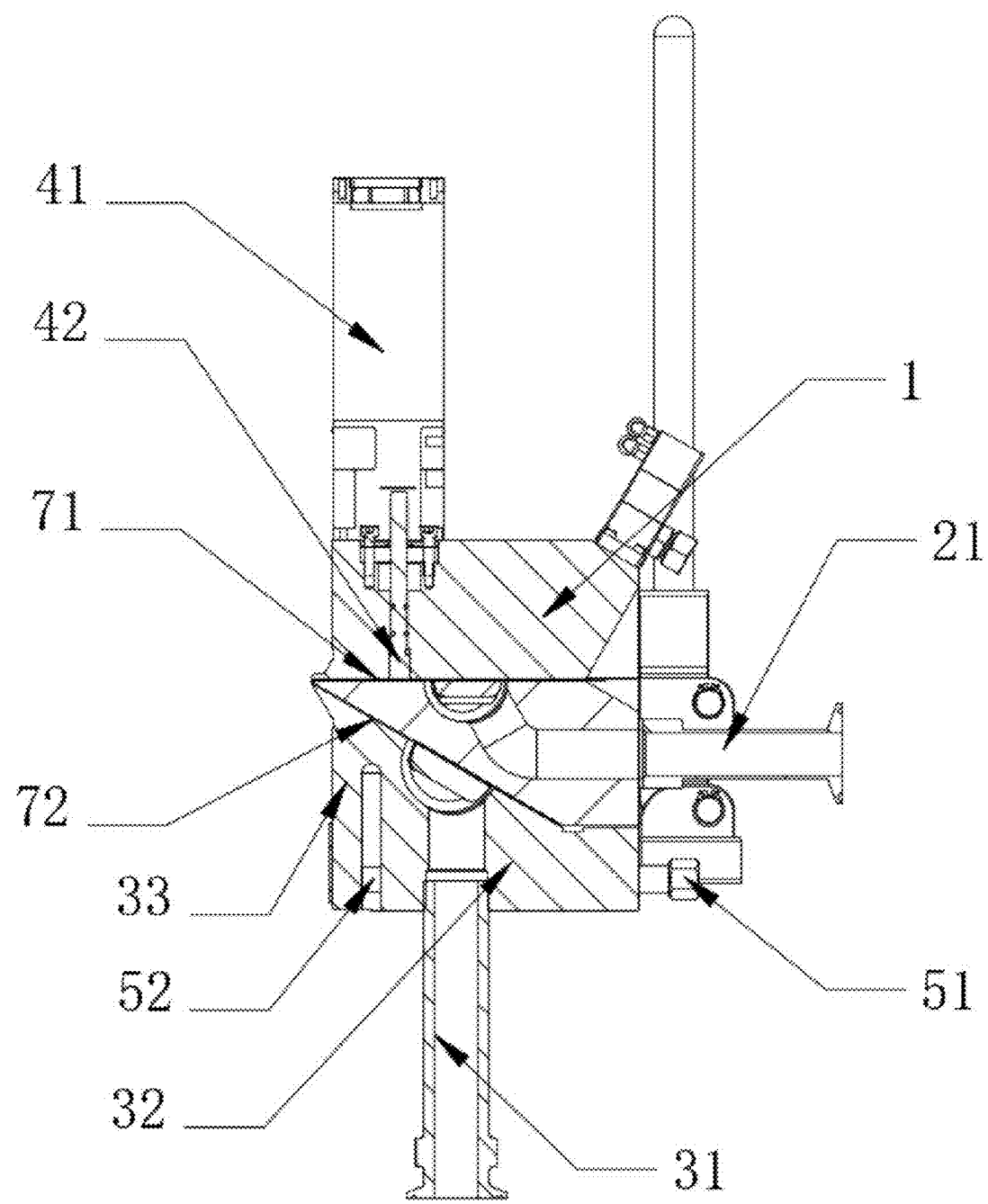
FIG. 3 is a sectional view of FIG. 2.
Figure 4:
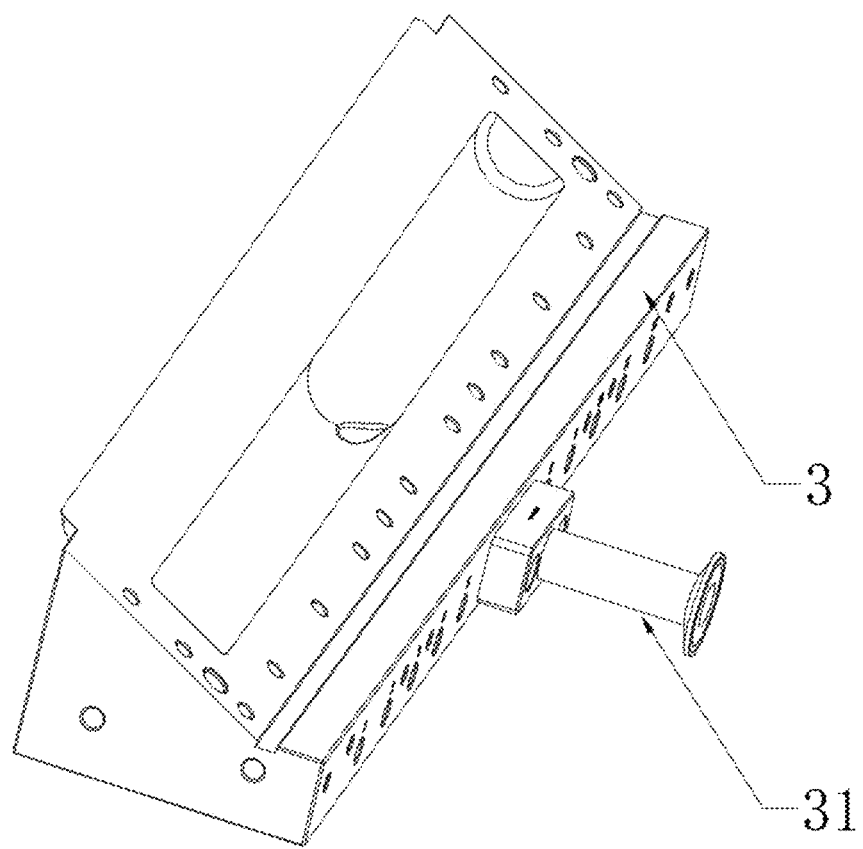
FIG. 4 is a structural schematic diagram of a variant implementation of a lower die in coating equipment provided by embodiments of the present application.
Figure 5:
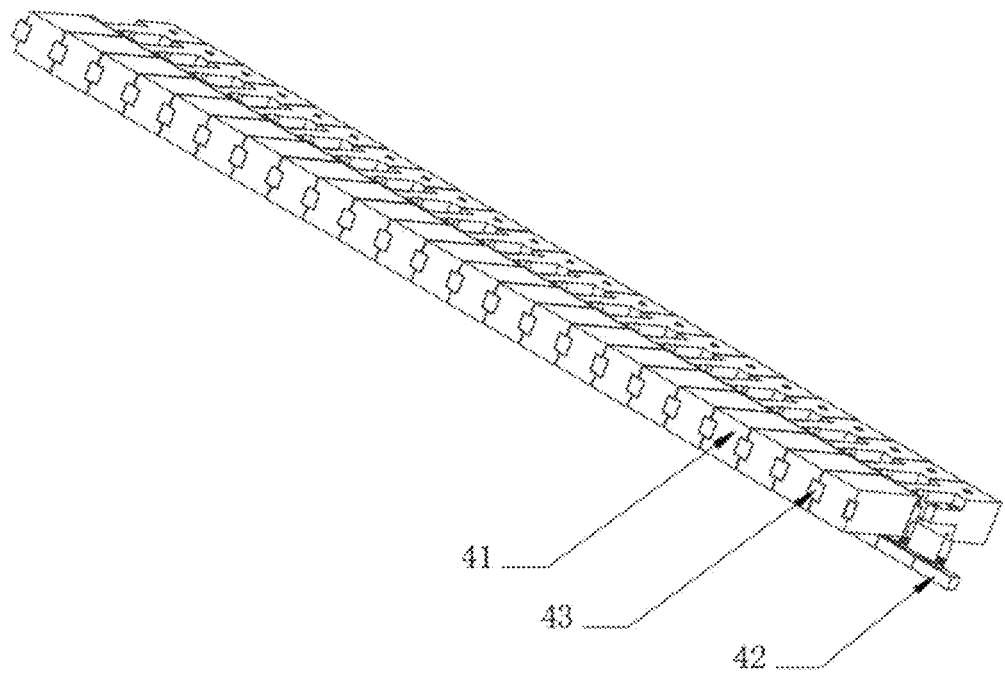
FIG. 5 is a structural schematic diagram of cooperation of a first driving board, a first adjusting piece and a first driving piece in coating equipment provided by embodiments of the present application.

1—upper die;
2—middle die; 21—first slurry-feeding port;
3—lower die; 31—second slurry-feeding port; 32—base part; 33—deformation part;
4—first adjusting mechanism; 41—first driving piece; 42—first adjusting piece; 43—first driving board;
5—second adjusting mechanism; 51—second driving piece; 52—second adjusting piece;
6—slurry parameter detector;
71—first slot; 72—second slot;
81—electrode piece; 82—lower coating; 83—upper coating;
91—glue dispensing valve; 92—first glue dispensing channel; 93—second glue dispensing channel.

DETAILED DESCRIPTION

The technical solutions of the present application will be clearly and completely described below with reference to the accompanying drawings. Obviously, the described embodiments are part of the embodiments of the present application, but not all of the embodiments. Based on the embodiments in the present application, all other embodiments obtained by those of ordinary skill in the art without creative work fall within the protection scope of the present application.

In the description of the present application, it should be noted that the terms "centre", "upper", "lower", "left", "right", "vertical", "horizontal", "inner", "outer", etc. for indicating orientation or positional relationship are based on the orientation or positional relationship shown in the accompanying drawings, which is only for the convenience of describing the present application and simplifying the description, rather than indicating or implying that the device or element referred to must have a specific orientation or be constructed or operated at a specific orientation, and therefore should not be construed as limitations on the present application. Furthermore, the terms "first", "second" and "third" are used for descriptive purposes only and should not be construed to indicate or imply relative importance.

In the description of the present application, it should be noted that, unless otherwise expressly specified and limited, the terms "installed", "connected" and "connection" should be understood in a broad sense, for example, connection can be fixed connection, or detachable connection, or integrated connection, can be mechanical connection, and can also be electrical connection, and can be direct connection, can also be indirect connection through an intermediate medium, and can be internal communication between two elements. For those of ordinary skill in the art, the specific meanings of the above terms in the present application can be understood in specific situations.

In addition, the technical features involved in the different implementations of the present application described below can be combined with each other as long as they do not conflict with each other.

Embodiment

1

This embodiment provides coating equipment, as shown in FIG. 1 to FIG. 6, the coating equipment comprises a coating die and a slurry parameter detector 6. The coating die comprises an upper die 1, a middle die 2, a lower die 3, a first adjusting mechanism 4 and a second adjusting mechanism 5. Wherein the upper die 1 and the middle die 2 form a first slot 71 configured for circulation of first slurry, the lower die 3 and the middle die 2 form a second slot 72 configured for circulation of second slurry, and an intersection angle is formed between the first slot 71 and the second slot 72; the first adjusting mechanism 4 is arranged on the upper die 1 and comprises a first driving piece 41 and a first adjusting piece 42, and a driving end of the first driving piece 41 is connected with the first adjusting piece 42; the second adjusting mechanism 5 is arranged on the lower die 3 and comprises a second driving piece 51 and a second adjusting piece 52, and a driving end of the second driving piece 51 is connected with the second adjusting piece 52; and the slurry parameter detector 6 is in communication connection with the first adjusting mechanism 4 and the second adjusting mechanism 5 and is configured to detect information of slurry on an electrode piece 81.

Specifically, the slurry parameter detector 6 is configured to detect slurry information of the first slurry coated on the electrode piece 81 via the first slot 71 and forms a first slurry parameter, and the first adjusting mechanism 4 is configured to adjust the position of the first adjusting piece 42 according to the first slurry parameter so as to adjust the flow rate of the first slurry circulating in the first slot 71; the slurry parameter detector 6 is further configured to detect slurry information of the second slurry coated on the electrode piece 81 via the second slot 72 and forms a second slurry parameter, and the second adjusting mechanism 5 is configured to adjust the position of the second adjusting piece 52 according to the second slurry parameter so as to adjust the flow rate of the second slurry circulating in the second slot 72.

In the coating equipment provided by this embodiment, by arranging the first adjusting mechanism 4 and the second adjusting mechanism 5, adjustment of the flow rate of the slurry circulating in the first slot 71 and the second slot 72 can be realized, and moreover, the parameters of the coated slurry are detected by the slurry parameter detector 6, and are then compared with preset values, and comparison results are fed back to the first adjusting mechanism 4 and the second adjusting mechanism 5 for adjustment of the first adjusting piece 42 and the second adjusting piece 52, so that automatic adjustment of double-layer die coating is realized, the debugging effectiveness is greatly improved, and the coating efficiency is further improved.

The coating equipment provided by this embodiment further comprises a first gasket and a second gasket. Wherein the first gasket is arranged between the upper die 1 and the middle die 2, so that the first gasket, the upper die 1 and the middle die 2 jointly define the first slot 71; the second gasket is arranged between the middle die 2 and the lower die 3, so that the second gasket, the middle die 2 and the lower die 3 jointly define the second slot 72.

In this embodiment, the first slot 71 is horizontally arranged, and the second slot 72 is obliquely arranged upwards in the flowing direction of the second slurry. For example, in this embodiment, the first slot 71 extends in the horizontal direction, and the second slot 72 is arranged at an inclination angle of 30 degrees relative to the first slot 71. Certainly, in other optional implementations, the inclination angle of the second slot 72 can be 45 degrees, 20 degrees and the like.

In the coating equipment provided by this embodiment, the first adjusting mechanism 4 further comprises a first driving board 43, the first driving board 43 is in communication connection with the first driving piece 41, and the first driving board 43 is in communication connection with the slurry parameter detector 6; the first driving piece 41 is configured to adjust the position, extending into the first slot 71, of the first adjusting piece 42 under the driving of the first driving board 43 so as to adjust the flow rate of the first slurry in the first slot 71. Specifically, the first driving piece 41 is one or more of a stepping motor, an ultrasonic motor and a piezoelectric motor. In this embodiment, the first adjusting piece 42 is a T-shaped block. The T-shaped block comprises a rod part and an intercepting part in the shape of a rectangular block, the intercepting part is arranged on a side close to the first slot 71, and when the intercepting part extends into the first slot 71, interception of the circulating process of the first slurry can be realized, and then the flow rate of the first slurry is adjusted.

In the coating equipment provided by this embodiment, at the intersection of the first slot 71 and the second slot 72, the upper die 1 and the lower die 3 jointly define a die lip for slurry to flow out; the lower die 3 comprises a deformation part 33 and a base part 32, the deformation part 33 is arranged on a side close to the die lip, and the base part 32 is arranged on a side away from the die lip; the second driving piece 51 is mounted on the base part 32, and the second adjusting piece 52 is connected with the deformation part 33; the second adjusting piece 52 has a die lip adjusting state of driving the deformation part 33 to move towards or away from the base part 32 under the action of the second driving piece 51, and in the die lip adjusting state, a lower lip of the lower die 3 is warped relative to an upper lip of the upper die 1.

As a first implementation of this embodiment, the second driving piece 51 is one or more of a stepping motor, an ultrasonic motor and a piezoelectric motor. The second adjusting piece is a connecting rod, one end of the connecting rod is connected with the output end of the motor, the other end of the connecting rod is connected with the deformation part 33, and therefore deformation of the deformation part is realized under the driving of the motor.

As a first implementation of this embodiment, the second adjusting piece 52 comprises a push rod and a pull rod, and when in use, the deformation part is pushed by the push rod to move away from the base part, or the deformation part is pulled by the pull rod to move towards the base part. Specifically, the push rod abuts against the side wall face of the deformation part, when the second driving piece drives a rigid screw to rotate, the push rod can push the deformation part to move, then the distance between the base part 32 and the deformation part 33 is adjusted, and then the lower lip of the lower die 3 is slightly deformed. The pull rod is in threaded connection with the deformation part, and when the second driving piece drives the pull rod to move, the pull rod can pull the deformation part to move towards the base part.

In the coating equipment provided by this embodiment, the second adjusting mechanism 5 further comprises a second driving board, the second driving board is in communication connection with the second driving piece 51, and the second driving board is in communication connection with the slurry parameter detector 6; the second driving piece 51 is configured to adjust the relative position between the base part 32 and the deformation part 33 under the driving of the second driving board so as to adjust the flow rate of the second slurry flowing out of the second slot 72.

In the coating equipment provided by this embodiment, the middle die 2 comprises a first slurry-feeding port 21, one end of the first slurry-feeding port 21 is configured to be connected with a first slurry-supply system, and the other end of the first slurry-feeding port 21 communicates with the first slot 71; the lower die 3 comprises a second slurry-feeding port 31, one end of the second slurry-feeding port 31 is configured to be connected with a second slurry-supply system, and the other end of the second slurry-feeding port 31 communicates with the second slot 72. The second slurry-feeding port 31 is formed in the bottom face of the lower die 3, and by the adoption of such arrangement of the second slurry-feeding port 31, the cutting amount of the lower die 3 is small, the production period is short, and the production process is simple.

Certainly, in other optional implementations, the second slurry-feeding port 31 can also be formed in the back side of the lower die 3.

In the coating equipment provided by this embodiment, the slurry parameter detector 6 is a thickness detector, and the thickness detector is configured to detect the thickness of slurry on the electrode piece 81; the thickness detector is a thickness detection instrument, specifically, an α-ray or β-ray type NDC measuring probe can be used, the mass of unit area can be measured, and then the coating thickness can be obtained; as another implementation of this embodiment, the slurry parameter detector 6 can also be a surface density detector, the surface density detector is configured to detect the surface density of slurry on the electrode piece 81, and the surface density detector can be a densimeter. Certainly, the thickness detector and the surface density detector can also be used at the same time.

The coating equipment provided by this embodiment further comprises a bus socket, and the bus socket is arranged at the two ends of the adjusting mechanism and is in communication connection with the driving board. Tabs at the two ends of the driving board are inserted into the bus socket, and due to the arrangement of the bus socket, power is provided for the adjusting mechanisms, and communication connection is realized for the multiple driving boards and the multiple adjusting mechanisms.

Figure 6:
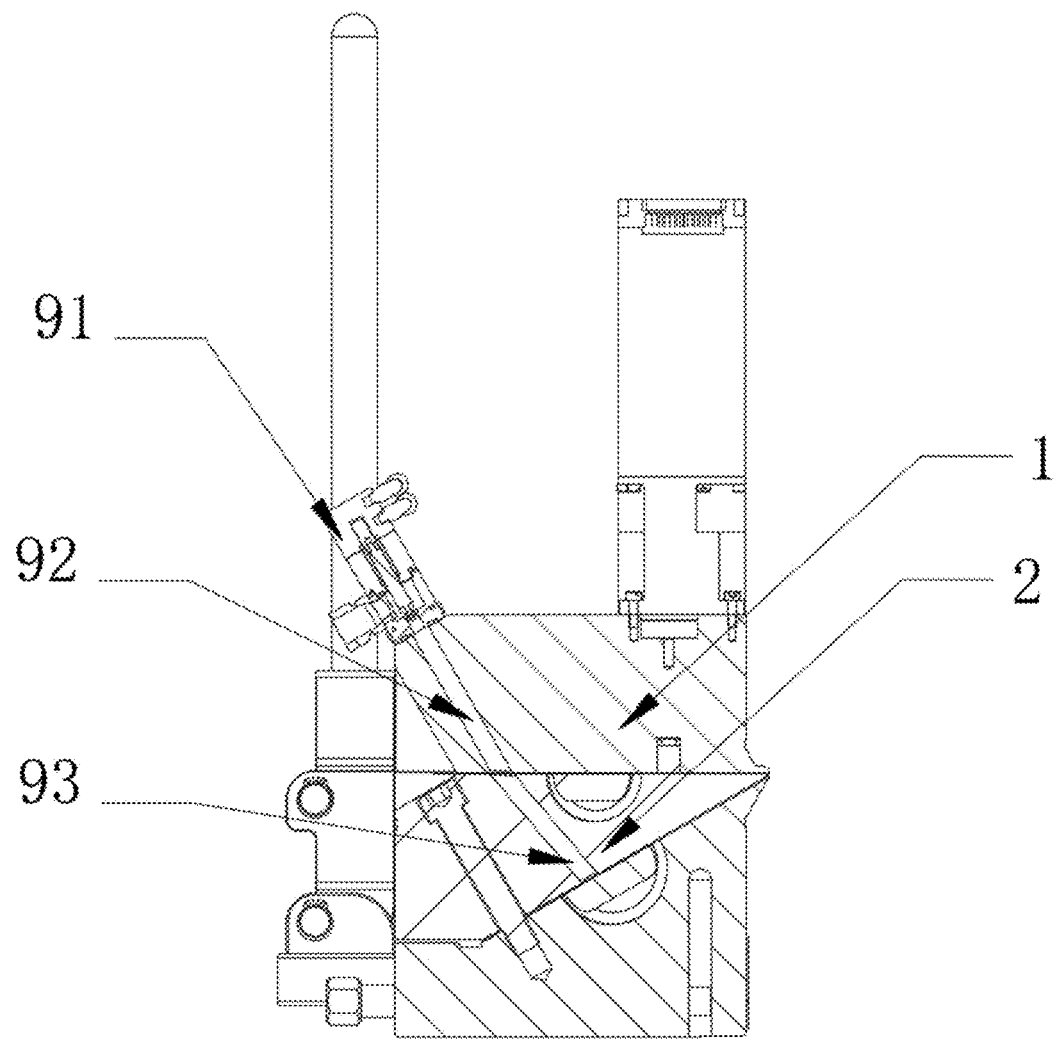
FIG. 6 is a structural schematic diagram of a glue dispensing mechanism in coating equipment provided by embodiments of the present application.

As shown in FIG. 6, the coating equipment provided by this embodiment further comprises a glue dispensing mechanism, and the glue dispensing mechanism comprises a glue dispensing valve 91 arranged on the upper die 1 and a first glue dispensing channel 92 arranged in the upper die. The glue dispensing channel 92 communicates with the glue dispensing valve 91, and the first glue dispensing channel 92 communicates with a glue flowing channel in the first gasket, so that upper-layer glue dispensing is realized.

In other optional implementations, in order to realize lower-layer glue dispensing of the glue dispensing mechanism while realizing upper-layer glue dispensing, a communicating hole can be formed in the first gasket, the glue dispensing mechanism further comprises a second glue dispensing channel 93 arranged in the middle die 2, the second glue dispensing channel communicates with the first glue dispensing channel 92 through the communicating hole, and the side, away from the first gasket, of the second glue dispensing channel 93 communicates with a glue flowing channel in the second gasket, and then lower-layer glue dispensing is realized.

In other optional implementations, the set positions of the first adjusting mechanism and the second adjusting mechanism can be changed, for example, the first adjusting mechanism can be arranged on the middle die, and the second adjusting mechanism can also be arranged on the middle die as long as the first adjusting mechanism can change the flow rate of the first slurry in the first slot and the second adjusting mechanism can change the flow rate of the second slurry in the second slot.

Embodiment2

Figure 7:
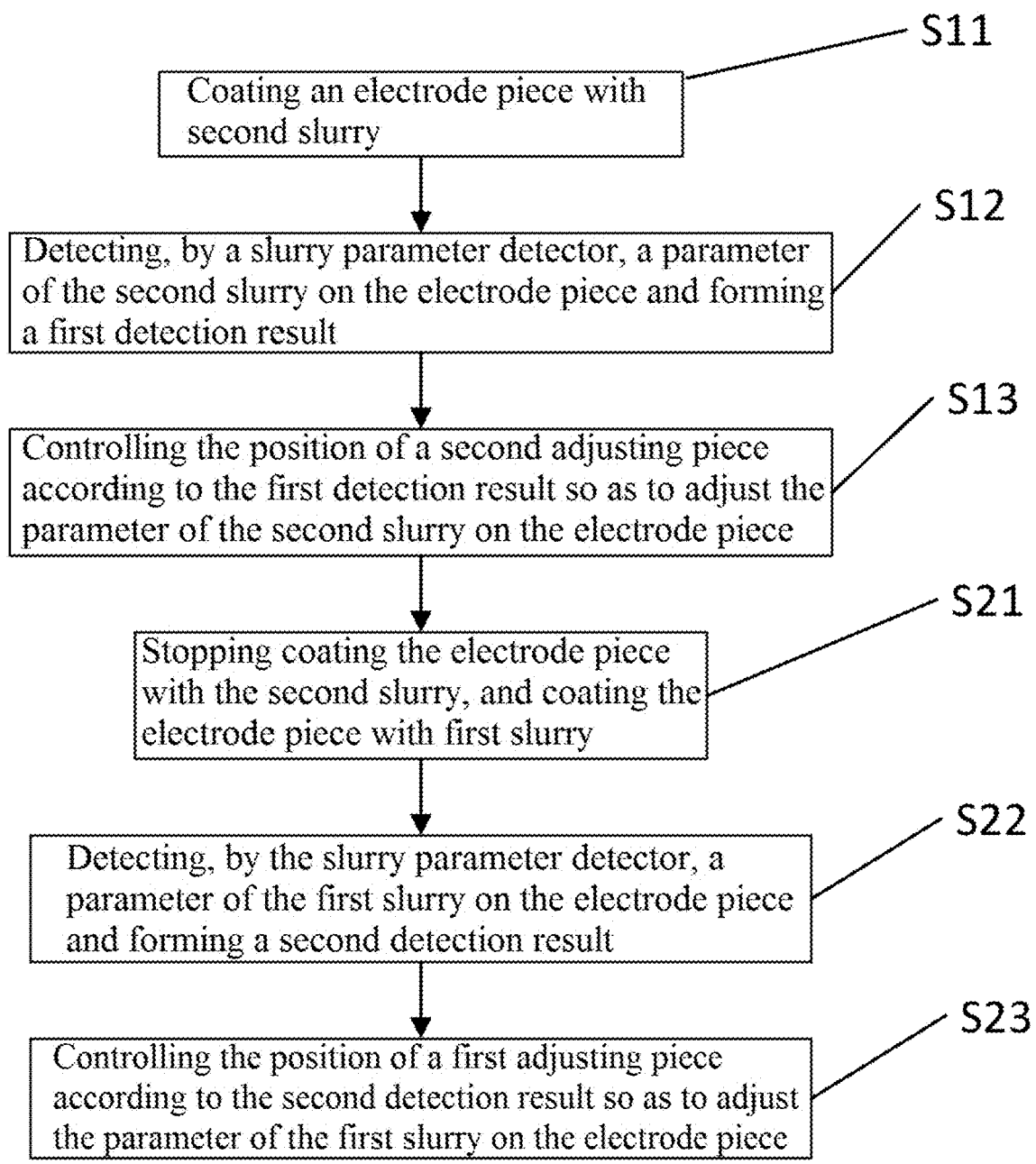
FIG. 7 is a flowchart of a coating method provided by embodiments of the present application.

This embodiment provides a coating method, as shown in FIG. 7, which comprises the following steps:

S11, coating an electrode piece 81 with second slurry;
wherein, firstly, a control valve on the side of a second slurry-feeding port 31 is opened, and a control valve on the side of a first slurry-feeding port 21 is closed, so that an electrode piece 81 is coated with a lower coating 82;

S12, detecting, by a slurry parameter detector 6, a parameter of the second slurry on the electrode piece 81 and forming a first detection result;
wherein, the parameter of the second slurry coated on the electrode piece 81 is obtained according to detection data fed back by a thickness detector or a surface density detector, and the parameter of the second slurry is compared with preset process requirements to obtain the first detection result, and the parameter of the second slurry can be actual film thickness detected by the thickness detector, and can also be the surface density, detected by the surface density detector, of the second slurry;

S13, controlling the position of a second adjusting piece 52 according to the first detection result so as to adjust the parameter of the second slurry on the electrode piece 81;
wherein, a second driving piece 51 is controlled by a second driving board to drive the second adjusting piece 52 to move, so that the relative position between a base part 32 and a deformation part 33 of a lower die 3 is changed, a lower lip is slightly deformed relative to an upper lip, the flow rate of the second slurry flowing out of a second slot 72 is adjusted, and further the surface density of the second slurry coated on the electrode piece 81 and the film thickness of the lower coating 82 are changed so as to adjust the parameter of the second slurry;

S21, stopping coating the electrode piece 81 with the second slurry, and coating the electrode piece 81 with first slurry;
wherein, when the parameter of the second slurry meets the preset process requirements, the control valve on the side of the second slurry-feeding port 31 is closed, and the control valve on the side of the first slurry-feeding port 21 is opened, so that the electrode piece 81 is coated with an upper coating 83;

S22, detecting, by the slurry parameter detector 6, a parameter of the first slurry on the electrode piece 81 and forming a second detection result;

wherein the parameter of the first slurry coated on the electrode piece 81 is obtained according to detection data fed back by the thickness detector or the surface density detector, the parameter of the first slurry is compared with preset process requirements to obtain the second detection result, at the moment, the parameter of the first slurry can be the sum of the film thickness of the lower coating 82 and the film thickness of the upper coating 83 detected by the thickness detector, and can also be the actual surface density, detected by the surface density detector, of the first slurry coated on the electrode piece;

S23, controlling the position of a first adjusting piece 42 according to the second detection result so as to adjust the parameter of the first slurry on the electrode piece 81;

Wherein a first driving piece 41 is controlled by a first driving board 43 to adjust the position, extending into the first slot 71, of the first adjusting piece 42, so that the flow rate of the first slurry in the first slot 71 is adjusted, the surface density of the first slurry coated on the electrode piece 81 and the film thickness of the lower coating 82 are changed, and further the parameter of the first slurry is adjusted;

S31, intermittently stopping coating the electrode piece 81 with the first slurry;
wherein, in the continuous coating process, the control valve on the side of the first slurry-feeding port 21 is periodically and intermittently closed; and S32, detecting the parameter of the second slurry on the electrode piece 81 and forming a third detection result.

Embodiment 3

This embodiment provides a coating method, and the specific coating method is the coating method provided in embodiment 2 and adopts the coating equipment provided in embodiment 1.

Obviously, the above embodiments are only examples for clear description, and are not intended to limit the implementations. For those of ordinary skill in the art, changes or modifications in other different forms can also be made on the basis of the above description. There is no need and cannot be exhaustive of all implementations here. However, the obvious changes or changes derived from this are still within the protection scope of the present application.

What is claimed is:

1. Coating equipment, wherein the coating equipment comprises:
a coating die, wherein the coating die comprises:
a first slot configured for circulation of first slurry and a second slot configured for circulation of second slurry, wherein an intersection angle is formed between the first slot and the second slot;
a first adjusting mechanism, wherein the first adjusting mechanism comprises a first driving piece and a first adjusting piece, and a driving end of the first driving piece is connected with the first adjusting piece; and
a second adjusting mechanism, wherein the second adjusting mechanism comprises a second driving piece and a second adjusting piece, and a driving end of the second driving piece is connected with the second adjusting piece; and
a slurry parameter detector, wherein the slurry parameter detector is in communication connection with the first adjusting mechanism and the second adjusting mechanism and is configured to detect information of slurry on an electrode piece;
the coating equipment further comprises an upper die, a middle die and a lower die, wherein the upper die and the middle die define the first slot, and the lower die and the middle die define the second slot;
the first adjusting mechanism is arranged on the upper die and/or the middle die, and the second adjusting mechanism is arranged on the lower die and/or the middle die;
wherein,
the slurry parameter detector is configured to detect slurry information of the first slurry coated on the electrode piece via the first slot and form a first slurry parameter, and the first adjusting mechanism is configured to adjust the position of the first adjusting piece according to the first slurry parameter so as to adjust the flow rate of the first slurry circulating in the first slot; the slurry parameter detector is also configured to detect slurry information of the second slurry coated on the electrode piece via the second slot and form a second slurry parameter, and the second adjusting mechanism is configured to adjust the position of the second adjusting piece according to the second slurry parameter so as to adjust the flow rate of the second slurry circulating in the second slot;
at the intersection of the first slot and the second slot, the upper die and the lower die jointly define a die lip for slurry to flow out;
the lower die comprises a deformation part and a base part, the deformation part is arranged on a side close to the die lip, and the base part is arranged on a side away from the die lip;
the second driving piece is mounted on the base part, and the second adjusting piece is connected with the deformation part; the second adjusting piece has a die lip adjusting state of driving the deformation part to move towards or away from the base part under the action of the second driving piece, and in the die lip adjusting state, a lower lip of the lower die is warped relative to an upper lip of the upper die;
the first adjusting piece is a T-shaped block, and the T-shaped block comprises a rod part and an intercepting part in the shape of a rectangular block, the intercepting part is arranged on a side close to the first slot, and when the intercepting part extends into the first slot, interception of the circulating process of the first slurry can be realized, so that the flow rate of the first slurry is adjusted.

2. The coating equipment according to claim 1, wherein the coating equipment further comprises:
a first gasket, wherein the first gasket is arranged between the upper die and the middle die, so that the first gasket, the upper die and the middle die jointly define the first slot; and
a second gasket, wherein the second gasket is arranged between the middle die and the lower die, so that the second gasket, the middle die and the lower die jointly define the second slot.

3. The coating equipment according to claim 1, wherein the middle die comprises a first slurry-feeding port, one end of the first slurry-feeding port is configured to be connected with a first slurry-supply system, and another end of the first slurry-feeding port communicates with the first slot;
the lower die comprises a second slurry-feeding port, one end of the second slurry-feeding port is configured to be connected with a second slurry-supply system, and another end of the second slurry-feeding port communicates with the second slot.

4. The coating equipment according to claim 1, wherein the slurry parameter detector is a thickness detector, and the thickness detector is configured to detect the thickness of slurry on the electrode piece;
and/or
the slurry parameter detector is a surface density detector, and the surface density detector is configured to detect the surface density of slurry on the electrode piece.

5. The coating equipment according to claim 4, wherein any one of the adjusting mechanisms further comprises a driving board, wherein the driving board is in communication connection with the corresponding driving piece, and the driving board is in communication connection with the slurry parameter detector;
the driving piece is configured to drive the corresponding adjusting piece to move under the driving of the driving board so as to adjust the flow rate of slurry in the corresponding slot.

6. The coating equipment according to claim 5, wherein the coating equipment further comprises a bus socket that is arranged on at least one side of the adjusting mechanism, and the bus socket is in communication connection with the driving board.

7. The coating equipment according to claim 1, wherein the coating equipment further comprises a glue dispensing mechanism which comprises a glue dispensing valve and a first glue dispensing channel, wherein the glue dispensing valve is mounted on the upper die, the first glue dispensing channel is arranged in the upper die, and the first glue dispensing channel communicates with the first slot and the glue dispensing valve;
the glue dispensing mechanism further comprises a second glue dispensing channel, wherein the second glue dispensing channel is arranged in the middle die, and the first slot communicates with the second slot through the second glue dispensing channel.

8. A coating method, which uses the coating equipment according to claim 1, wherein the coating method comprises:
coating an electrode piece with second slurry;
detecting, by the slurry parameter detector, a parameter of the second slurry on the electrode piece and forming a first detection result;
controlling the position of the second adjusting piece according to the first detection result so as to adjust the parameter of the second slurry on the electrode piece;
stopping coating the electrode piece with the second slurry, and coating the electrode piece with first slurry;
detecting, by the slurry parameter detector, a parameter of the first slurry on the electrode piece and forming a second detection result; and
controlling the position of the first adjusting piece according to the second detection result so as to adjust the parameter of the first slurry on the electrode piece.

9. The coating method according to claim 8, wherein the coating method comprises:
during a continuous coating process, periodically and intermittently closing a control valve on a side of a first slurry-feeding port.

* * * * *